United States Patent
Reed et al.

(10) Patent No.: US 9,686,028 B2
(45) Date of Patent: Jun. 20, 2017

(54) PUBLIC LOCATION INDIVIDUAL AUDIO DELIVERY DEVICE AND METHOD

(71) Applicants: M'Lissa Reed, Nampa, ID (US); Aaron Reed, Nampa, ID (US)

(72) Inventors: M'Lissa Reed, Nampa, ID (US); Aaron Reed, Nampa, ID (US)

( * ) Notice: Subject to any disclaimer, the term of this patent is extended or adjusted under 35 U.S.C. 154(b) by 0 days.

(21) Appl. No.: 14/932,595

(22) Filed: Nov. 4, 2015

(65) Prior Publication Data

US 2017/0126342 A1   May 4, 2017

(51) Int. Cl.
| | |
|---|---|
| *H04H 40/00* | (2009.01) |
| *H04H 20/71* | (2008.01) |
| *H04H 60/09* | (2008.01) |
| *H04H 20/61* | (2008.01) |
| *H04H 20/57* | (2008.01) |
| *H04W 4/00* | (2009.01) |

(52) U.S. Cl.
CPC ............ *H04H 20/61* (2013.01); *H04H 20/57* (2013.01); *H04H 20/71* (2013.01); *H04W 4/008* (2013.01)

(58) Field of Classification Search
CPC ..................................................... H04H 20/61
USPC ..................................... 455/3.06, 3.01, 3.04
See application file for complete search history.

(56) References Cited

U.S. PATENT DOCUMENTS

| | | |
|---|---|---|
| D562,808 S | 2/2008 | Gwee |
| 7,603,080 B2 | 10/2009 | Richenstein et al. |
| 2003/0002689 A1 | 1/2003 | Folio |
| 2004/0220862 A1* | 11/2004 | Jackson ................. G06F 3/002 705/26.1 |
| 2006/0046656 A1 | 3/2006 | Yang |
| 2007/0004472 A1 | 1/2007 | Gitzinger |
| 2008/0161954 A1* | 7/2008 | Zuo ........................ H04H 20/02 700/94 |
| 2012/0033135 A1* | 2/2012 | Spinelli .................... H04N 5/45 348/565 |
| 2012/0224725 A1 | 9/2012 | Prevot et al. |
| 2012/0287340 A1* | 11/2012 | Wadey ..................... H04N 5/45 348/462 |
| 2013/0188006 A1 | 7/2013 | McMahon |

FOREIGN PATENT DOCUMENTS

WO    WO9605663    2/1996

* cited by examiner

*Primary Examiner* — Tilahun B Gesesse

(57) ABSTRACT

A public location individual audio delivery device and method allows individual access and control to audio associated with a visual presentation within a public location. The device includes a display located in a public location. A receiver is coupled to the display and receives video for presentation on the display. The receiver receives audio associated to the video. A transmitter is coupled to the display and is communicatively coupled to the receiver. The transmitter transmits the audio associated to the video as an audio signal through a personal access network within the public location. At least one personal audio device is positioned within the public location accessing and receiving the audio signal through the personal access network wherein the audio associated to the video is played on the personal audio device.

10 Claims, 4 Drawing Sheets

PUBLIC LOCATION INDIVIDUAL AUDIO DELIVERY DEVICE AND METHOD

BACKGROUND OF THE DISCLOSURE

Field of the Disclosure

The disclosure relates to audio delivery devices and more particularly pertains to a new audio delivery device for allowing individual access and control to audio associated with a visual presentation within a public location.

SUMMARY OF THE DISCLOSURE

An embodiment of the disclosure meets the needs presented above by generally comprising a display located in a public location. A receiver is coupled to the display and receives video for presentation on the display. The receiver receives audio associated to the video. A transmitter is coupled to the display and is communicatively coupled to the receiver. The transmitter transmits the audio associated to the video as an audio signal through a personal access network within the public location. At least one personal audio device is positioned within the public location accessing and receiving the audio signal through the personal access network wherein the audio associated to the video is played on the personal audio device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
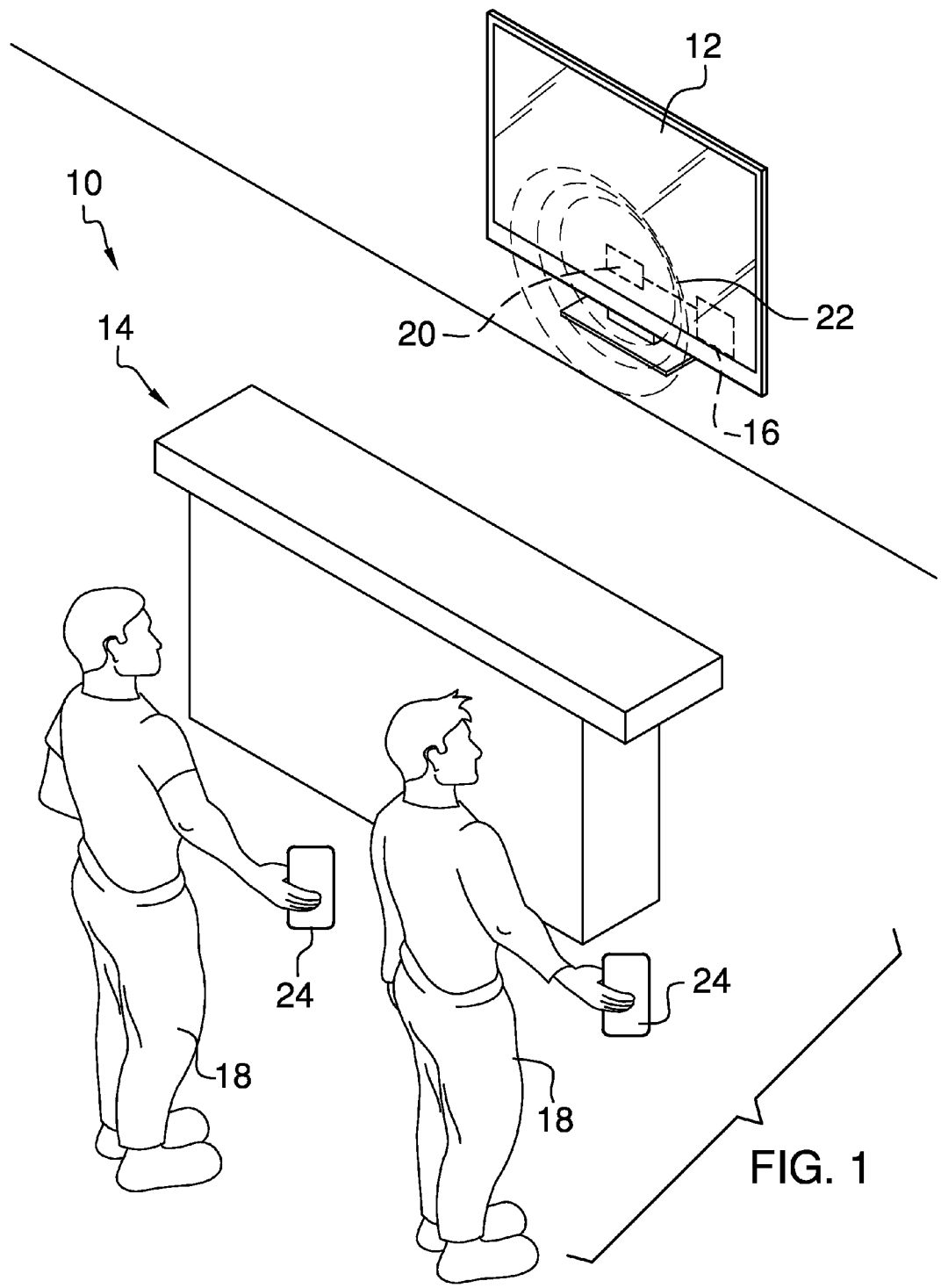
FIG. 1 is a top front side perspective view of a public location individual audio delivery device and method according to an embodiment of the disclosure.
Figure 2:
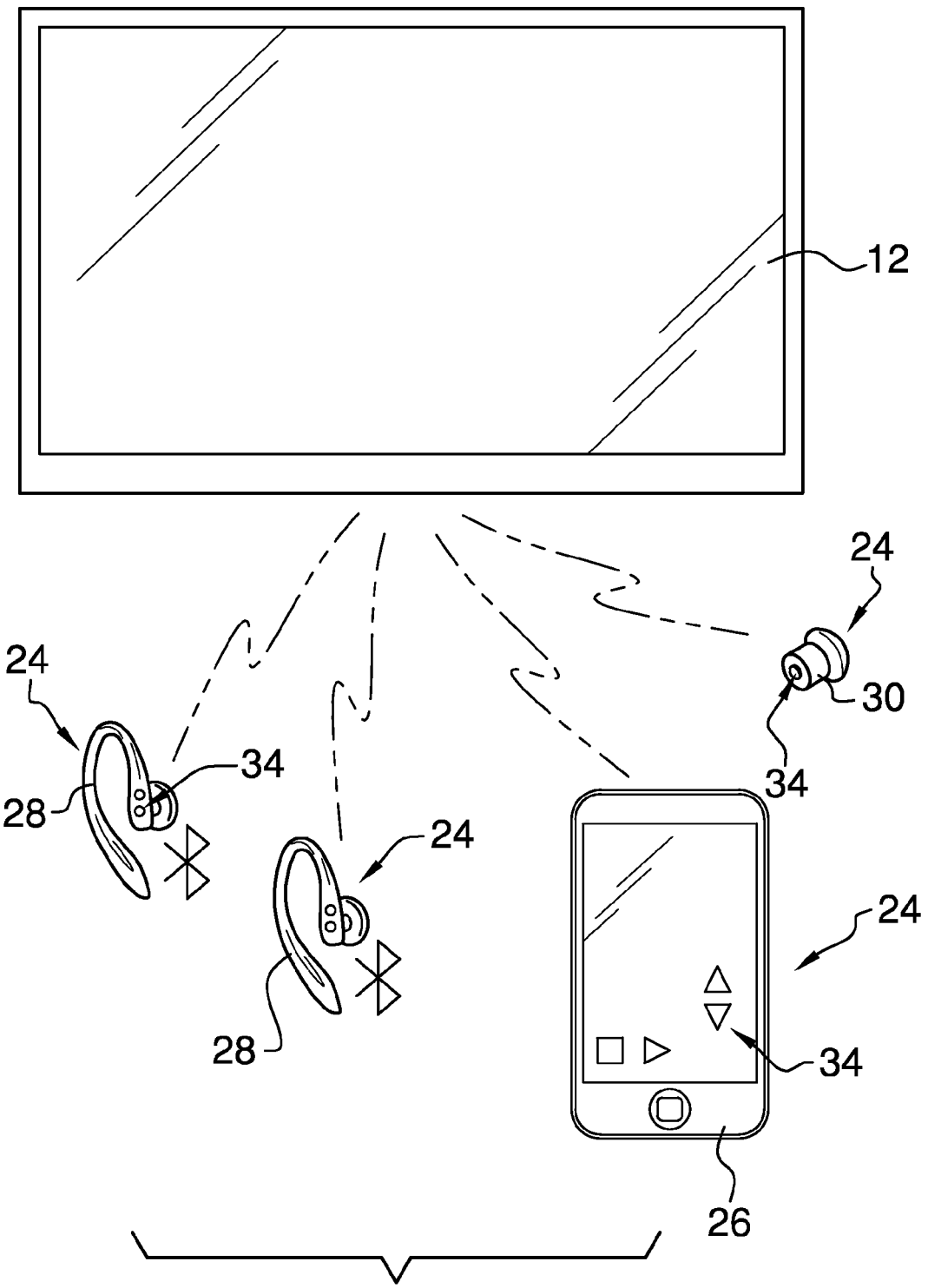
FIG. 2 is a front view of an embodiment of the disclosure.
Figure 3:
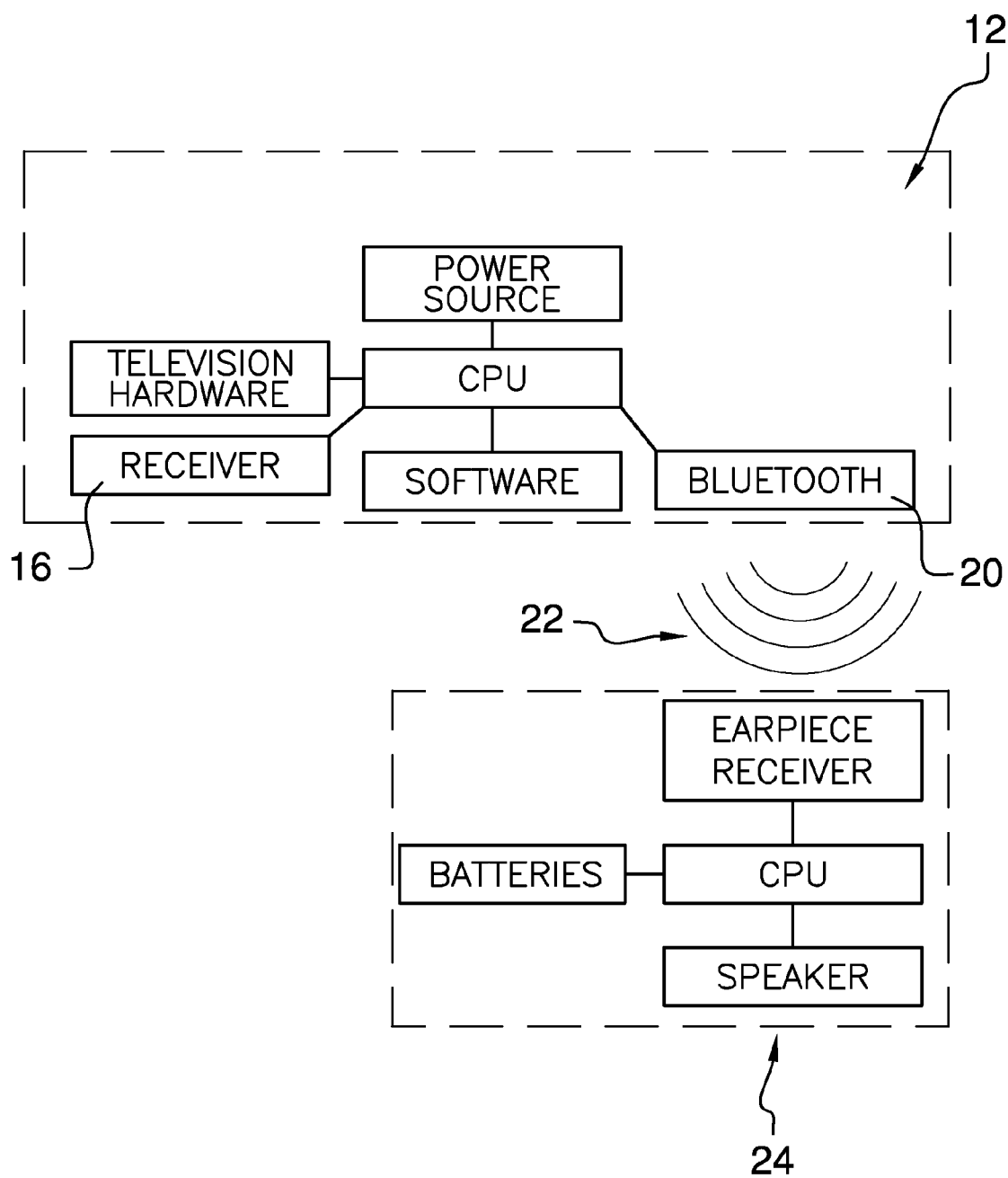
FIG. 3 is a schematic view of an embodiment of the disclosure.
Figure 4:
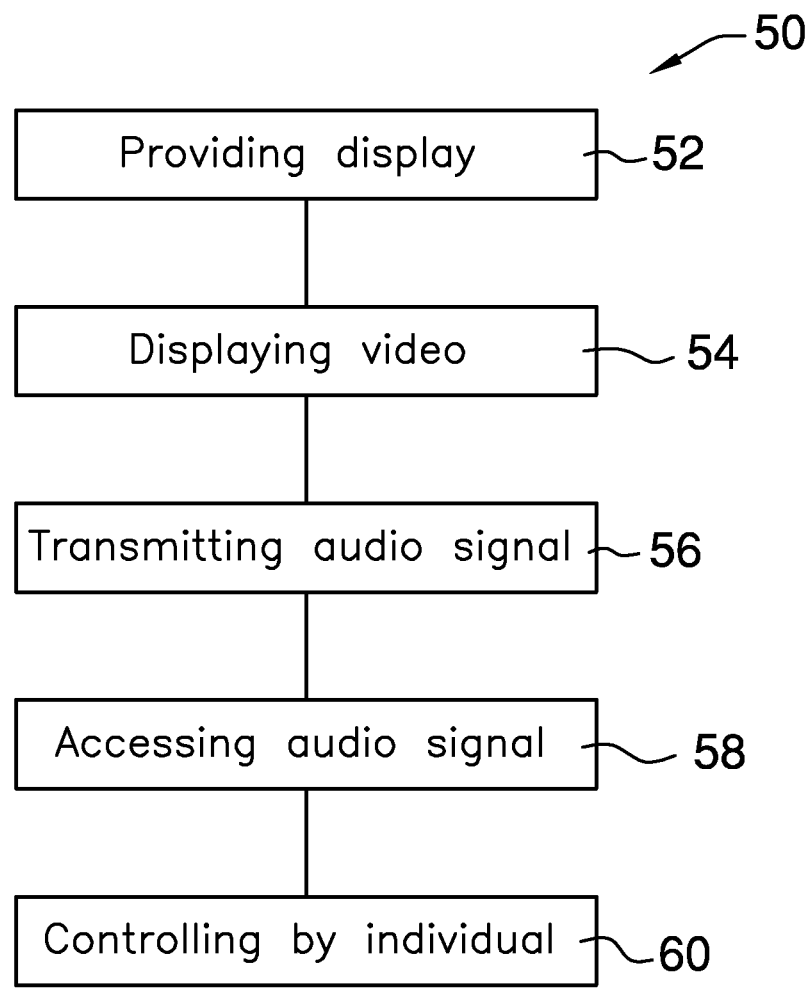
FIG. 4 is a schematic view of a method according to an embodiment of the disclosure.

With reference now to the drawings, and in particular to FIGS. 1 through 4 thereof, a new audio delivery device embodying the principles and concepts of an embodiment of the disclosure and generally designated by the reference numeral 10 will be described.

As best illustrated in FIGS. 1 through 4, the public location individual audio delivery device and method 10 generally comprises a display 12 such as a conventional television or monitor located in a public location 14 such as a restaurant, sports bar, or the like. A receiver 16 is coupled to the display 12. The receiver 16 receives video for presentation on the display 12 in a conventional manner. The receiver 16 also receives audio associated to the video. The display 12 may include speakers or may be a monitor without speakers. The device 10 is designed to permit individuals 18 within the public location 14 to view the video on the display 12 without public broadcast of the audio allowing patrons to comfortably talk at reduced volumes compared to having to speak over the broadcast of the audio associated to the video. A transmitter 20 is coupled to the display 12. The transmitter 20 is communicatively coupled to the receiver 16 and transmits the audio associated to the video as an audio signal 22 through a personal access network within the public location 14.

At least one personal audio device 24 is positioned within the public location 14. The personal audio device 24 may be provided specifically by ownership of the public location 14 or may be personal property of the patrons of the public location. For example, the personal audio device 24 may be a phone 26, headset 28, earbud 30, or the like. The personal audio device 24 accesses and receives the audio signal 22 through the personal access network wherein the audio associated to the video is played on the personal audio device 24. The personal audio device 24 has controls 34 thereon such that a volume of the audio associated to the video being played by the personal audio device 24 is controllable by manipulation of the controls 34 on the personal audio device 24. Thus, the individual may select volume based on personal preference and the audio associated to the video may be provided directly to the individual without broadcast to the entirety of the public location 14.

An access code may be associated with the personal access network wherein the audio signal 22 is accessible only after confirmation of the access code through the personal audio device 24. Thus, access to audio associated to the video may be restricted, if desired, to paying customers, patrons of the public location 14, attendees of the public location, or the like.

In use, the device 10 provides for a method 50 of providing audio associated to a video to patrons within a public location. The audio associated to the video is individually controlled and audible to patrons within the public location. The steps of the method 50 include a step 52 of providing the display 12 located within the public location 14. Another step 54 is displaying the video on the display 12 within the public location 14 without an audible broadcast of the audio associated to the video being broadcast from the display 12 or an associated public broadcast system of speakers or the like within the public location 14. Yet another step 56 is transmitting the audio associated to the video as the audio signal 22 through the personal access network within the public location 14. Still another step 58 is one or more individuals accessing the audio signal 22 using respective personal audio devices 24 positioned within the public location 14 including personal possession by the individual within the public location 14. Another step 60 is each personal audio device 24 accessing the audio signal 22 broadcasting the audio associated to the video to the individual using the respective personal audio device 24 wherein each individual may control the volume and listen without adversely effecting other patrons ability to hear and talk to each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A public location individual audio delivery device comprising:
    a display located in a public location;
    a receiver coupled to said display, said receiver receiving video for presentation on said display, said receiver receiving audio associated to said video;
    a transmitter coupled to said display, said transmitter being communicatively coupled to said receiver, said transmitter transmitting said audio associated to said video as an audio signal through a personal access network within said public location while said video is presented on said display without said audio associated to said video being broadcast within said public location;
    at least one personal audio device positioned within said public location, said personal audio device accessing and receiving said audio signal through said personal access network wherein said audio associated to said video is played on said personal audio device and an access code being associated with said personal access network wherein said audio signal is accessible only after confirmation of said access code through said personal audio device.

2. The public location individual audio delivery device of claim 1, further comprising said personal audio device being a phone.

3. The public location individual audio delivery device of claim 1, further comprising said personal audio device having controls thereon such that a volume of said audio associated to said video being played by said personal audio device is controllable by manipulation of said controls on said personal audio device.

4. The public location individual audio delivery device of claim 1, further comprising said personal audio device being a headset.

5. The public location individual audio delivery device of claim 1, further comprising said personal audio device being an earbud.

6. A public location individual audio delivery device comprising:
    a display located in a public location;
    a receiver coupled to said display, said receiver receiving video for presentation on said display, said receiver receiving audio associated to said video;
    a transmitter coupled to said display, said transmitter being communicatively coupled to said receiver, said transmitter transmitting said audio associated to said video as an audio signal through a personal access network within said public location while said video is presented on said display without said audio associated to said video being broadcast within said public location;
    at least one personal audio device positioned within said public location, said personal audio device accessing and receiving said audio signal through said personal access network wherein said audio associated to said video is played on said personal audio device;
    said personal audio device having controls thereon such that a volume of said audio associated to said video being played by said personal audio device is controllable by manipulation of said controls on said personal audio device; and
    an access code being associated with said personal access network wherein said audio signal is accessible only after confirmation of said access code through said personal audio device.

7. The public location individual audio delivery device of claim 6, further comprising said personal audio device being a phone.

8. The public location individual audio delivery device of claim 6, further comprising said personal audio device being a headset.

9. The public location individual audio delivery device of claim 6, further comprising said personal audio device being an earbud.

10. A method of providing audio associated to a video to patrons within a public location such that the audio is individually controlled and audible to patrons within the public location, the steps of the method comprising:
    providing a display located within the public location, said display receiving video for presentation on said display, said receiver receiving audio associated to said video;
    displaying said video on said display within the public location without an audible broadcast of said audio associated to said video being broadcast in the public location;
    transmitting said audio associated to said video as an audio signal through a personal access network within said public location;
    one or more individuals accessing said audio signal using a respective personal audio device positioned within the public location; and
    each personal audio device accessing said audio signal broadcasting said audio associated to said video to the individual using said respective personal audio device and an access code being associated with said personal access network wherein said audio signal is accessible only after confirmation of said access code through said personal audio device.

* * * * *